United States Patent
Walker et al.

(10) Patent No.: US 8,078,818 B2
(45) Date of Patent: Dec. 13, 2011

(54) METHOD AND SYSTEM FOR MIGRATING MEMORY SEGMENTS

(75) Inventors: William J. Walker, Cypress, TX (US); Paras A. Shah, Houston, TX (US); James K. Yu, Houston, TX (US); Kenneth Jansen, Spring, TX (US); Vasileios Balabanos, Cypress, TX (US); Andrew D. Olsen, Houston, TX (US); Phillip M. Jones, Round Rock, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1371 days.

(21) Appl. No.: 11/066,038

(22) Filed: Feb. 25, 2005

(65) Prior Publication Data

US 2005/0257010 A1 Nov. 17, 2005

Related U.S. Application Data

(60) Provisional application No. 60/569,955, filed on May 11, 2004.

(51) Int. Cl.
*G06F 12/00* (2006.01)
*G06F 13/00* (2006.01)
*G06F 13/28* (2006.01)
(52) U.S. Cl. ............... 711/165; 711/147; 711/E21.002; 709/232; 709/233
(58) Field of Classification Search ........... 711/147, 711/165, E12.002; 709/232, 233
See application file for complete search history.

(56) References Cited

U.S. PATENT DOCUMENTS

| | | | | |
|---|---|---|---|---|
| 5,269,013 A | * | 12/1993 | Abramson et al. | 711/170 |
| 5,727,150 A | * | 3/1998 | Laudon et al. | 709/215 |
| 6,347,362 B1 | * | 2/2002 | Schoinas et al. | 711/147 |
| 2004/0010544 A1 | * | 1/2004 | Slater et al. | 709/203 |
| 2004/0012625 A1 | * | 1/2004 | Lei et al. | 345/738 |

OTHER PUBLICATIONS

R. Iyer and L.N. Bhuyan, "Design and Evaluation of a Switch Cache Architecture for CC-NUMA Multiprocessors," IEEE Trans. Computers, vol. 49, No. 8, pp. 779-797, Aug. 2000.*
R. Iyer, L.N. Bhuyan, and A. Nanda, "Using Switch Directories to Speed Up Cache-to-Cache Transfers in CC-NUMA Multiprocessors," Proc. 12th Int'l Parallel and Distributed Processing Symp., pp. 721-728, May 2000.*
R. Iyer, L.N. bhuyan, "Switch Cache: A Framework for Improving the Remote Memory Access Latency of CC-NUMA Multiprocessors," Proc. Fifth Int'l, Conf. High Performance Computer architecture (HPCA-5), pp. 152-160, Jan. 1999.*
L.N. Bhuyan and H. Wang, "Switch MSHR: A Technique to Reduce Remote Read Memory Access Time in CC-NUMA Multiprocessors", IEEE Transactions on Computers, vol. 52, No. 5, May 2003.*
Gene Cooperman, "Cache Basics," Copyright 2003, 3 pp. [Online] http://www.ccs.neu.edu/course/com3200/parent/NOTES/cache-basics.html.

* cited by examiner

*Primary Examiner* — Michael Alsip

(57) ABSTRACT

A system comprises a plurality of nodes coupled together via a switching device. Each node comprises a processor coupled to a memory. Migration logic in the switching device is configured to migrate segments of each memory to the switching device.

18 Claims, 3 Drawing Sheets

METHOD AND SYSTEM FOR MIGRATING MEMORY SEGMENTS

CROSS-REFERENCE TO A RELATED APPLICATION

The present application claims the benefit of, and incorporates by reference, provisional application Ser. No. 60/569,955, filed May 11, 2004, and entitled "Method And System For Migrating Memory Segments."

BACKGROUND

Computer systems may utilize multiple processors to increase processing power. The workload may be divided and distributed among the processors, thereby reducing execution time and increasing performance. In such systems, resources, such as processors and memory, may be segmented into groups referred to as nodes. Each node may comprise one or more processors coupled to a physical memory. A processor in a node may access the memory assigned to its node, referred to as local memory referencing, or a processor may access memory assigned to other nodes, referred to as remote memory referencing. Unfortunately, remote memory referencing results in increased latency and thus reduced performance relative to local memory referencing.

SUMMARY

In accordance with at least some embodiments, a system comprises a plurality of nodes coupled together via a switching device. Each node comprises a processor coupled to a memory. Migration logic in the switching device is configured to migrate segments of each memory to the switching device.

BRIEF DESCRIPTION OF THE SYSTEM AND DRAWINGS

A better understanding of the disclosed systems and methods may be obtained by reference to the following drawings, in which.

NOTATION AND NOMENCLATURE

Certain terms are used throughout the following description and claims to refer to particular components and systems. Various companies may refer to components by different names. This document does not intend to distinguish between components and systems that differ in name but not function.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
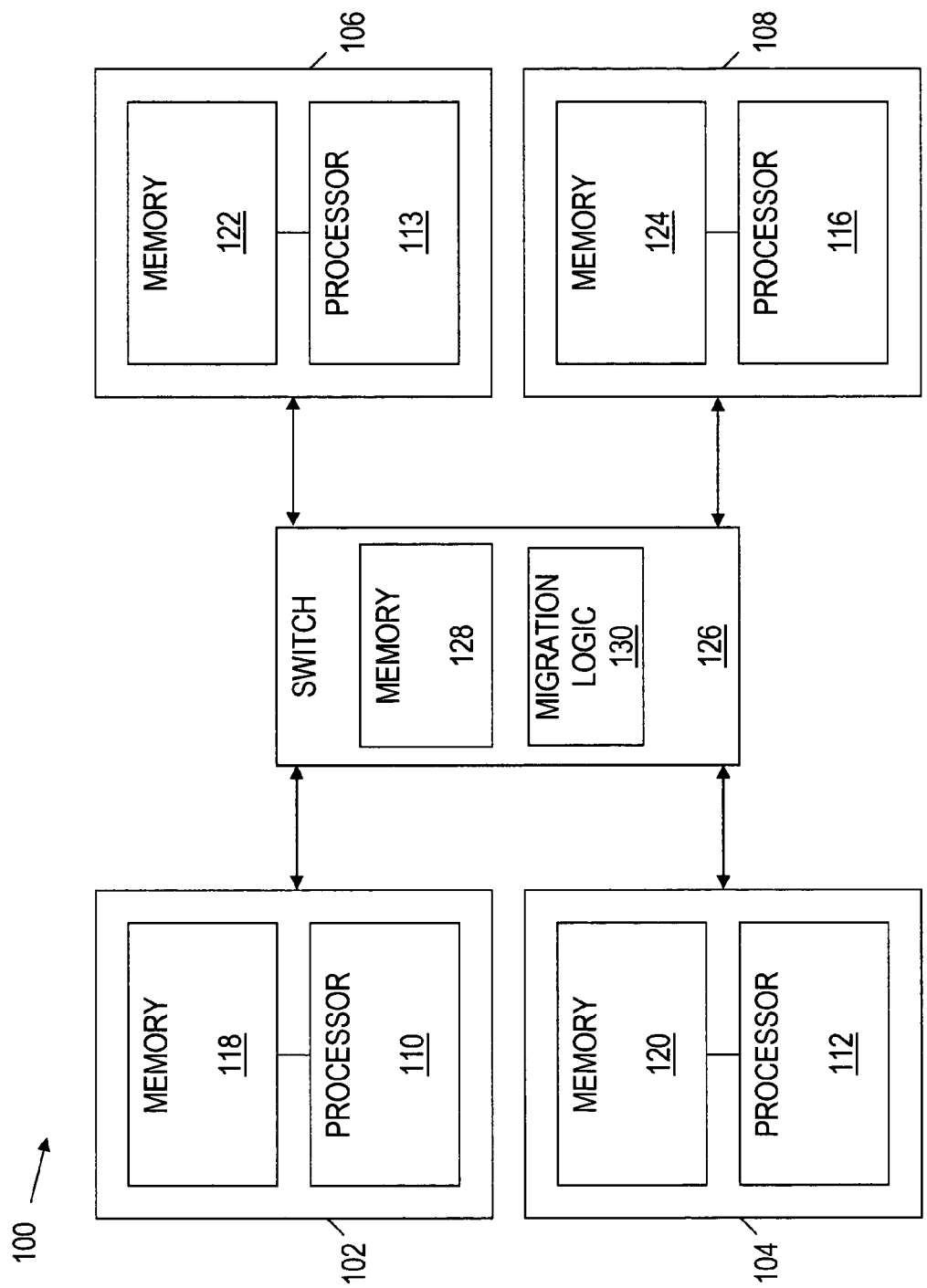
FIG. 1 illustrates a computer system configured in accordance with various embodiments of the invention.

Referring to FIG. 1, a system 100 is shown in accordance with embodiments of the invention. As shown, system 100 comprises a plurality of nodes 102-108. Each node 102-108 comprises one or more processors 110-116 coupled to a memory 118-124, respectively. The memory 118-124 may comprise any type of volatile or non-volatile memory, such as random access memory (RAM), read-only memory (ROM), and synchronous dynamic RAM (SDRAM). In addition, each node 102-108 may comprise a memory controller (not specifically shown in FIG. 1) that manages its respective local memory 118-124. The system 100 may be representative of a non-uniform memory access (NUMA) computer system, a symmetric multi-processing (SMP) computer system, or other type of system that comprises distributed memory that is accessible to a plurality of processors.

Each node 102-108 may be coupled to a switch 126. The switch 126 may be any type of switching device, such as a network switch, a router, and a hub, that is capable of transferring data between the nodes 102-108. The switch 126 may comprise migration logic 130 and a memory 128. Through the switch 126, any processor 110-116 may access any region of the memory 118-124 via a common address space. For example, the processor 112 may access the memory 124 by referencing a memory address range that corresponds to the memory 124. The switch 126 may equate the referenced memory address range with the node 108 and allow data to be transferred between the nodes 104 and 108.

The migration logic 130 may be integrated with the management portion of any system software (not specifically shown) that operates on the switch 126. The migration logic 130 alternatively may be implemented through hardware, such as logic gates, or software executed by any processing logic (not specifically shown) of the switch 126. The migration logic 130 may utilize heuristics, performance counters, and threshold values to monitor, identify, and predict frequently accessed segments of the memories 118-124. Once the frequently accessed segments are identified, the contents of such segments may be migrated from the nodal memory 118-124 to the switch memory 128.

The migration of a memory segment copies the data and directory structure associated with the identified memory segment to the switch memory 128. The directory structure may comprise a tag, index, offset, and valid field for a memory addressable portion of the identified segment. After migration, the processors 110-116 may access the data associated with a migrated segment from the switch memory 128, as opposed to accessing the data from the remote nodal memories 118-124. While the memory segment is migrated, all accesses, such as reads and/or writes, to the memory segment may occur in the switch memory 128.

Figure 2:
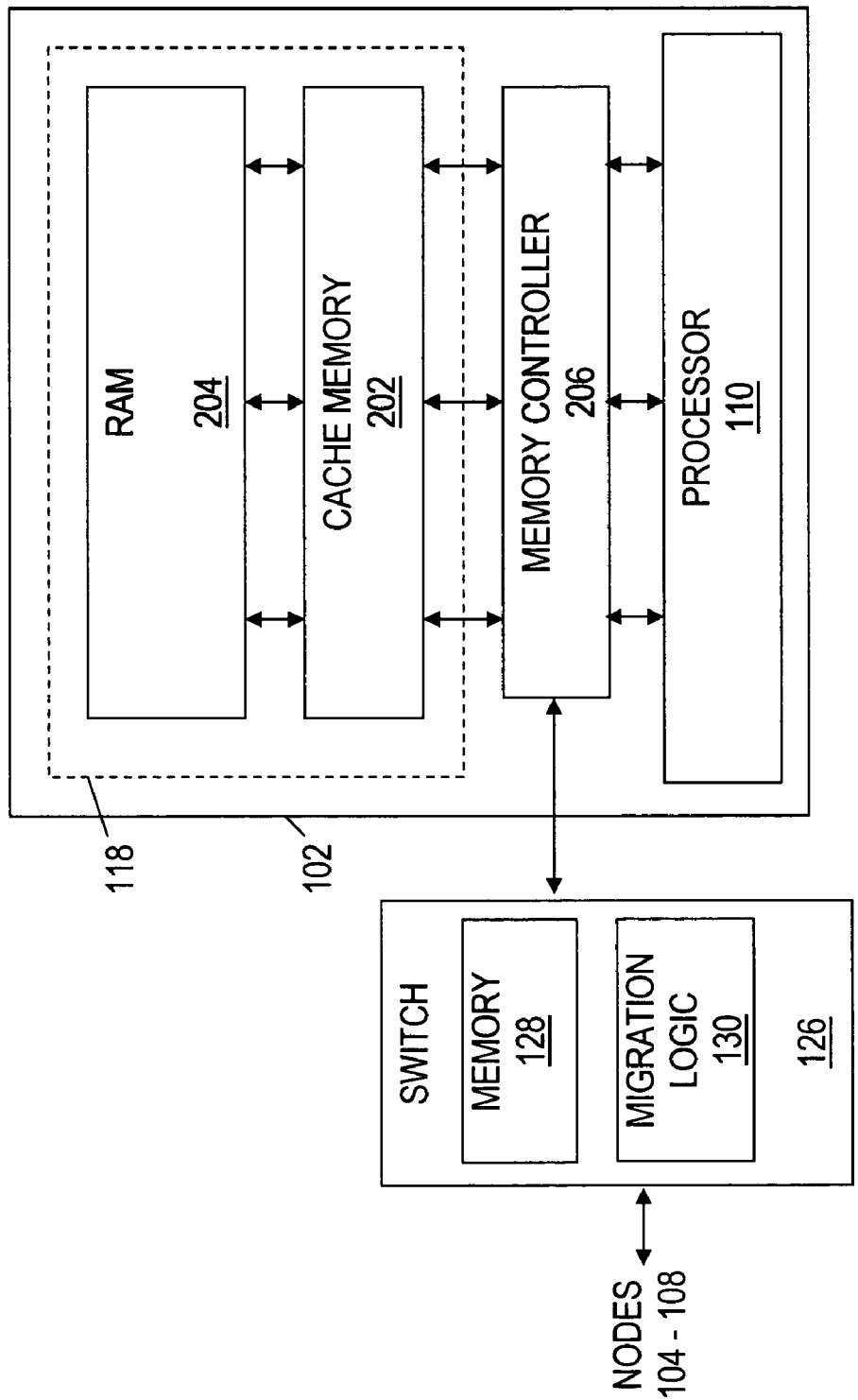
FIG. 2 illustrates a block diagram of a node of FIG. 1.

Referring now to FIG. 2, one of the nodes (node 102) of system 100 is illustrated in greater detail. As shown, the node 102 comprises the local memory 118, a memory controller 206, and the processor 110. The local memory 118 comprises a cache memory 202 and RAM 204. The processor 110 reads and writes data to and from the local memory 118 by sending requests to the memory controller 206. If a valid copy of the requested data is stored in the cache memory 202, the data is retrieved from the cache memory 202. If a valid copy of the data requested is not stored in the cache memory 202, the RAM 204 is accessed to retrieve the requested data.

The cache memory 202 may comprise one or more levels of cache memory. Each level may comprise any type of cache memory, such as write-back, direct-mapped, and set-associative. In addition, the memory controller 206 may utilize one or more cache coherency states, such as modified, exclusive, shared, and invalid (MESI), to maintain the coherency of the cache memory 202.

The nodes 104-108 may access the memory 118 by sending memory requests via the switch 126. Each request is associated with a memory address that represents a region of the memories 118-124. Based on the number of such requests, the migration logic 130 may determine which cache lines are accessed over a defined number of times. Such cache lines may be migrated to the switch 126. The defined number of accesses that determine whether a cache line is migrated may be referred to as the threshold value.

In some embodiments of the invention, the threshold value may be defined over a given time period. For example, the threshold may represent ten memory requests in a five-minute period. If the migration logic 130 determines that the threshold has been met with respect to a specific memory address, the cacheline associated with the memory address may be migrated to the switch memory 128.

Figure 3:
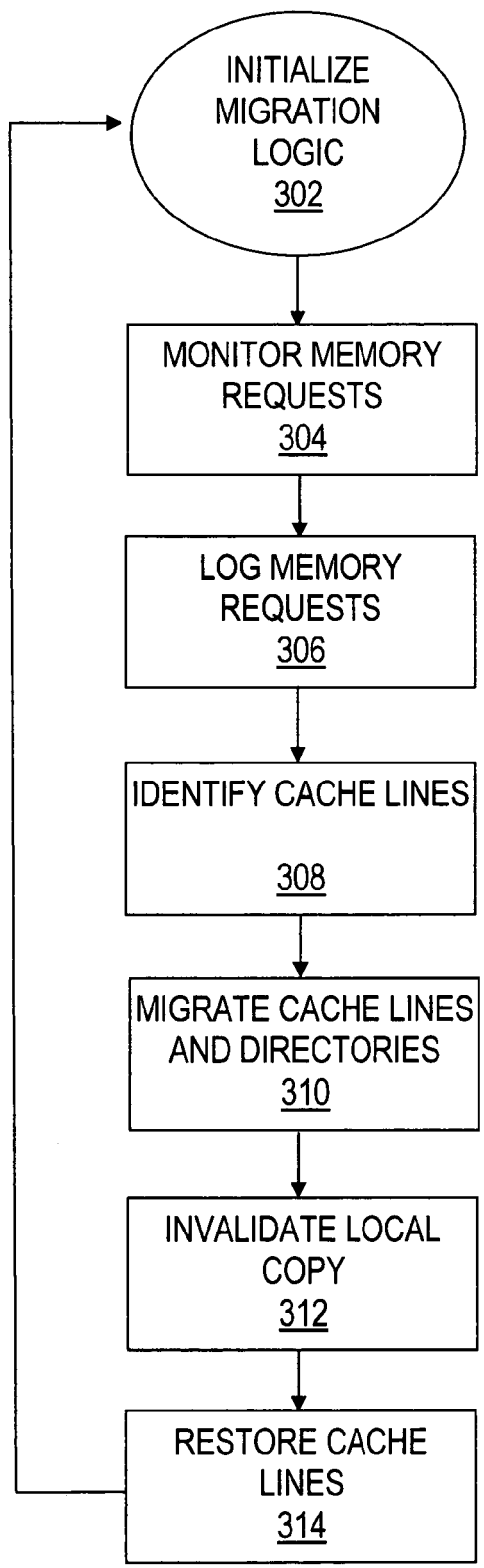
FIG. 3 illustrates a flowchart of a data migration procedure in accordance with embodiments of the invention.

Referring now to FIG. 3, an exemplary migration procedure is shown. The procedure may start with a switch initialization or power-up procedure that initializes the migration logic 130 (block 302). After initialization, the migration logic 130 monitors memory requests from the nodes 102-108 (block 304). The monitored memory requests may be logged and stored in the switch memory 128. The migration logic 130 identifies frequently used cache lines of the memories 118-124 that exceed the threshold value (block 308). The switch 126 migrates the identified cache lines and associated directory structures to the switch memory 128 (block 310). Before a node 102-108 modifies the migrated cache line (by a write operation), the node 102-108 from which the cache line originated may continue to reference the cache line in that node's local cache. After the migrated cache line in the switch 126 is modified by another node 102-108, the local copy of the cache line in the originating node may be invalidated, causing all nodes to access the cache line via the switch memory 128 (block 312).

The cache line may be restored to originating node by the migration logic 130 after a time period defined in the migration logic 130, or when the load on the cache line falls below the threshold value (block 314). For example, migrated cache lines may be removed from the switch memory 128 and written back to the orientating node after being stored in the switch memory 128 for a defined time period of two hours. Alternatively, the migration logic 130 may continually monitor the frequency of memory requests to a given cache line and restore the cache line to the originating node when the threshold value is no longer met.

When the switch 126 receives a memory request from a node 102-108, the request may be examined by the migration logic 130 to determine whether the requested memory address has been migrated to the switch 126. If the memory address has been migrated, the switch may directly handle the request by utilizing the memory segment referenced by the request and the associated migrated directory structure. If the segment has not been migrated, the switch may route the request to the appropriate node 102-108 that contains the needed data. The memory controller of appropriate node may receive and handle the request.

In accordance with at least some embodiments, the migration logic 130 may model various system conditions, such as date and time, operating system type and version, and locality of memory requests, to predict which regions of the memories 118-124 may become frequently accessed. For example, the migration logic 130 may analyze the historical record of memory requests that have been logged to the switch memory 128 and determine that a specific region of memory becomes frequently accessed (above the threshold value) every Monday morning. The migration logic may utilize this information to migrate the associated cache lines to the switch 126 before the next Monday morning, thereby predicting demand on the memories 118-124 and taking the predicted load off the nodes 102-108.

Numerous variations and modifications will become apparent to those skilled in the art once the above disclosure is fully appreciated. For example, the amount and size of the memory segments identified and migrated by the exemplary migration procedure may vary according to system designs. In particular, the migration logic may utilize the capacity of the switch memory to determine the maximum number of migrated segments to allow. Alternatively, restrictions may be imposed that limit the total number of segments migrated to the switch. The restrictions may limit the number of segments that are to be migrated from a particular node or all of the nodes. It is intended that the following claims be interpreted to embrace all such variations and modifications.

What is claimed is:

1. A system, comprising:
a plurality of nodes, each node comprising a processor coupled to a memory; and
a switching device coupled to the plurality of nodes and containing migration logic that is configured to identify segments of memory that are each accessed above a threshold, said threshold defining both a number of times a segment is accessed and a time period for the number of times, and that is configured to migrate segments of each memory so identified to a memory of the switching device so that each migrated segment is accessible to each of the processors.

2. The system of claim 1 wherein the switching device comprises a device selected from a group consisting of a network switch, hub, and router.

3. The system of claim 1 wherein the switching device is adapted to store directory structures associated with the migrated segments in the memory of the switching device.

4. The system of claim 1 wherein the migration logic is further configured to predict future demand of segments of each memory based on past memory requests and based on time of day of said past memory requests.

5. The system of claim 1 wherein the migration logic is further configured to log memory requests to a memory in the switching device.

6. The system of claim 1 wherein the migration logic is further configured to monitor access requests to each memory.

7. The system of claim 1 wherein the migration logic is further configured to restore previously migrated segments to each memory from which the respective segment originated.

8. The system of claim 1 wherein the switching device comprises a processor and the migration logic comprises software that is executed by the processor.

9. The system of claim 1 wherein the system comprises an architecture selected from a group consisting of non-uniform memory access (NUMA) and symmetric multi-processing (SMP).

10. A switch, comprising:
   a means for coupling to a plurality of nodes;
   a means for determining whether a set of data has been accessed more than a threshold number of times in a given time period to identify frequently accessed sets of data stored in the plurality of nodes; and
   a means for copying the identified sets of data from the plurality of nodes to a memory in the switch.

11. The switch of claim 10 further comprising a means for moving the identified sets of data from the memory in the switch to the node that previously stored the sets.

12. The switch of claim 10 further comprising a means for modeling future demand of a set of data stored in the plurality of nodes at a particular time of day.

13. The switch of claim 12 wherein the means for identifying frequently accessed sets of data identifies sets of data based on the means for modeling future demand.

14. A method, comprising:
   identifying memory segments that are accessed over a threshold, said threshold specifying both a number of times and an associated time period; and
   copying the identified segments to a memory of a switching device that couples together a plurality of processing nodes.

15. The method of claim 14 further comprising migrating directories associated with the memory segments.

16. The method of claim 14 further comprising restoring previously identified and copied segments to a memory that previously stored the segments.

17. The method of claim 14 wherein identifying memory segments comprises predicting memory segments that are to be accessed a threshold number of time based on previous memory accesses.

18. The system of claim 4 wherein, upon the migration logic predicting a future access of a memory segment at a particular time of day, said migration logic migrates such memory segment before the next time that particular time of day occurs.

* * * * *